United States Patent [19]

Kawaguchi et al.

[11] Patent Number: 5,408,459
[45] Date of Patent: Apr. 18, 1995

[54] OPENING/CLOSING DOOR MECHANISM FOR A RECORDING/REPRODUCING APPARATUS

[75] Inventors: Eiji Kawaguchi, Tokyo; Katuyoshi Itoh; Fuminori Imamura, both of Kawasaki, all of Japan

[73] Assignees: Copal Company Limited, Tokyo; Fujitsu Limited, Kanagawa, both of Japan

[21] Appl. No.: 82,416

[22] Filed: Jun. 28, 1993

[30] Foreign Application Priority Data

Jun. 29, 1992 [JP] Japan .................. 4-170461

[51] Int. Cl.$^6$ .................. G11B 33/00; G11B 33/06; G11B 33/14
[52] U.S. Cl. .................. 369/77.2; 360/97.02; 360/99.06
[58] Field of Search .................. 369/75.1, 75.2, 77.1, 369/77.2; 360/97.01, 97.04, 99.02, 99.03, 99.06, 99.07, 96.5

[56] References Cited

U.S. PATENT DOCUMENTS

| | | | |
|---|---|---|---|
| 4,641,212 | 2/1987 | Yokota et al. | 360/99 |
| 4,691,257 | 9/1987 | Taguchi | 360/97.02 |
| 4,754,471 | 6/1988 | Dieterlen | 369/77.1 |
| 4,785,365 | 11/1988 | Ohkita | 360/96.5 |
| 5,229,987 | 7/1993 | Aoki | 360/97.02 |

FOREIGN PATENT DOCUMENTS

| | | |
|---|---|---|
| 0307917A1 | 3/1989 | European Pat. Off. . |
| 0431966A2 | 6/1991 | European Pat. Off. . |
| 3336604A1 | 4/1984 | Germany . |
| 0063001 | 4/1984 | Japan .................. 360/97.02 |
| 0055547 | 3/1985 | Japan .................. 369/75.1 |
| 60-113382 | 6/1985 | Japan .................. 360/132 |
| 0200386 | 8/1988 | Japan .................. 369/75.1 |
| 0013283 | 1/1989 | Japan .................. 369/77.1 |
| 0245355 | 10/1991 | Japan .................. 369/75.1 |
| 4095292 | 3/1992 | Japan .................. 360/96.5 |
| 4106754 | 4/1992 | Japan . |

OTHER PUBLICATIONS

European Search Report on European Patent Application No. EP93401668, dated Nov. 3, 1994.

*Primary Examiner*—A. J. Heinz
*Assistant Examiner*—Brian E. Miller
*Attorney, Agent, or Firm*—Finnegan, Henderson, Farabow, Garrett & Dunner

[57] ABSTRACT

An opening/closing door mechanism including an apparatus having predetermined recording and/or reproducing means for moving a cartridge having a predetermined shape in a substantially parallel state to perform insertion and ejection of the cartridge through an insertion/ejection opening in order to perform a recording and/or reproducing operation with respect to a medium incorporated in the cartridge, a panel main body having an opening portion arranged near the insertion/ejection opening to guide the cartridge so as to allow the cartridge to move, a first door including a pivot support portion having one end pivotally supported at one edge portion of the opening portion in a longitudinal direction thereof, and a lock portion, arranged near the pivot support portion, a first biasing spring for biasing the first door toward the front surface of the panel main body to cover the opening portion, a second door including a pivot support portion having one end pivotally supported near the edge portion and a locking portion arranged near the pivot support portion to lock with respect to the lock portion, and a second biasing spring for biasing the second door toward the rear surface of the panel main body to cover the opening portion.

12 Claims, 9 Drawing Sheets

OPENING/CLOSING DOOR MECHANISM FOR A RECORDING/REPRODUCING APPARATUS

BACKGROUND OF THE INVENTION

The present invention relates to an opening/closing door mechanism and an apparatus having the mechanism and, more particularly, to a mechanism suitably applied to an apparatus for performing one or both of recording and reproducing operations with respect to a medium stored in a cartridge having a predetermined shape.

A conventional recording/reproducing apparatus, which uses, so to speak, a disk cartridge as a recording medium has been put into practice. The disk cartridge is obtained by rotatably housing a magnetic disk represented by a 3.5-inch flexible magnetic disk in a cartridge having a predetermined shape. A recording/reproducing operation is performed after this disk cartridge is inserted in the apparatus. The cartridge is ejected after the operation.

A recording/reproducing apparatus of this type has an opening/closing door arranged on a front panel of the apparatus. The door is pushed open when a cartridge containing a floppy disk (to be referred to an FD hereinafter) is manually inserted into an opening portion, and is automatically closed upon ejection of the cartridge.

More specifically, in general, an opening/closing door which is always biased in a closing direction at, e.g., an opening portion of a front panel, is axially supported on the front panel to be pivotal. When an FD cartridge is inserted into the opening portion to be translated, the door is opened while a distal end portion of the door is in slidable contact with an upper surface portion of the FD cartridge. During a recording/reproducing operation upon insertion of the FD cartridge, the contact state is kept to obtain dust- and sound-proof effects.

With such an operation of the opening/closing door, dust- and sound-proof effects during a recording/reproducing operation using an FD cartridge are obtained, and an improvement in appearance and a dust-proof function during a nonuse period of the apparatus are realized.

A home video tape recorder (VTR) uses a video tape cassette formed by incorporating a magnetic tape wound around a supply reel and a take-up reel in a cartridge. In this apparatus, an opening/closing door through which a video tape cassette is inserted and ejected has a function of automatically opening/closing when an inserting/ejection operation is performed. The home VTR has such an automatic opening/closing door because the apparatus has a margin in terms of outer dimensions. More specifically, in the home VTR, in order to prevent a recording/reproducing mechanism on the VTR main body side from interfering with an opening/closing operation of the opening/closing door when a video tape cassette is inserted/ejected, for example, a structure for lowering the video tape cassette, which is inserted through the opening/closing door, from the insertion position can be arranged on the VTR side.

According to the above-described conventional opening/closing door for an FD cartridge, the distal end portion of the door, which is always biased to pivot in the closing direction at the opening portion, is brought into contact with the upper surface of the FD cartridge so as to realize dust- and sound-proof functions. Therefore, the VTR is used while the rear end face as a portion of the FD cartridge and its vicinity area are exposed.

Since the VTR is used while the rear end face as a portion of the FD cartridge and its vicinity area are exposed, satisfactory dust- and sound-proof functions cannot be performed. Especially in a magneto-optical disk apparatus or the like using a recording medium having a high recording density, a satisfactory dust-proof function may not be ensured.

If an elevating mechanism for a medium is to be arranged to arrange an automatic opening/closing door capable of sufficiently opening a medium insertion opening as in the above-described home VTR, a medium cannot be horizontally inserted and cannot be horizontally ejected after the VTR is used. Therefore, the overall height of the magneto-optical disk apparatus is undesirably increased.

SUMMARY OF THE INVENTION

The present invention, i.e., an opening/closing mechanism and a recording/reproducing apparatus having the same, therefore, has been made in consideration of the above situation, and has as its object to provide an opening/closing door mechanism which can reduce the profile of the apparatus by allowing a medium to be substantially horizontally inserted into an opening portion and to be ejected upon a recording/reproducing operation, has an excellent dust-proof function, and prevents a third person from knowing the contents of a cartridge as a medium in use when a rear end portion of the cartridge as the medium is used as a display portion.

In order to solve the above problem and achieve the above object, the opening/closing door mechanism of the present invention has the following arrangement.

That is, there is provided an opening/closing door mechanism for a recording/reproducing apparatus designed to allow a medium housed in a cartridge having a predetermined shape to be inserted therein, perform a recording/reproducing operation, and eject the cartridge, comprising a panel main body arranged on a front surface of the recording/reproducing apparatus, an opening front portion arranged in the panel main body and having a predetermined opening size to allow the cartridge to be inserted and ejected, an opening portion having an opening innermost portion formed by a wall portion extending from an edge portion of the opening front portion, a first door axially supported to pivot from the opening innermost portion to the opening front portion to cover the opening innermost portion and having a lock hole, and a second door axially supported to pivot from the opening front portion to the opening innermost portion to cover the opening innermost portion and having a projection locked in the lock hole.

With the above-described arrangement, when a medium is not inserted, the first door is pivoted/biased by a first biasing force to cover the opening innermost portion and holds the second door in a locked state so as to allow a medium to be inserted. When a medium is inserted, the first door is pivoted and opened while the door is released from the locked state, and the first and second doors are pivoted while the doors are biased against the upper surface of the medium. Thereafter, the medium is set in a mounting position, and the opening innermost portion is covered with the second door.

When the medium is to be ejected, the second door is pivoted, and the opening innermost portion is covered with the first door.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENT

Figure 1:
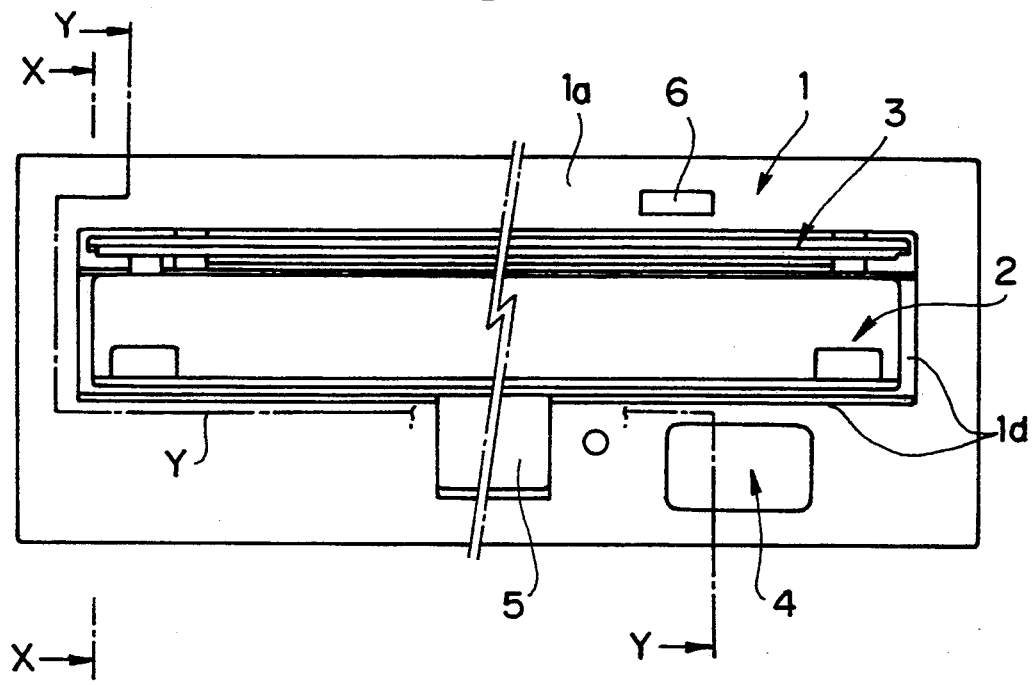
FIG. 1 is a front view showing an opening/closing door mechanism according to an embodiment of the present invention.

A preferred embodiment of the present invention will be described below with reference to the accompanying drawings. FIG. 1 is a front view of an opening/closing door mechanism according to the embodiment. Referring to FIG. 1, a panel main body 1 is formed by injection molding using a resin material or by sheet metal processing. The panel main body 1 has a horizontally oblong opening portion 1a formed therein integrally or separately.

A recess 5 which allows a finger tip to be inserted is formed under a middle portion of the opening portion 1a to allow the user to press and hold, e.g., a magneto-optical disk (to be referred to as an MO disk hereinafter) when the disk is inserted/removed. An ejection button 4 for ejecting the MO disk is arranged at a lower right position with respect to the opening portion 1a. A display lens 6 for displaying an operation state is arranged at an upper right position with respect to the opening portion 1a.

A wall portion extends from an edge portion 1d at the front end of the opening portion 1a toward the rear side corresponding to the lower surface side of the drawing. A second door 3 can be housed in the opening portion 1a to extend along the ceiling portion of the wall portion, while the innermost rear portion of the opening portion is sealed with a first door 2.

Figure 2:
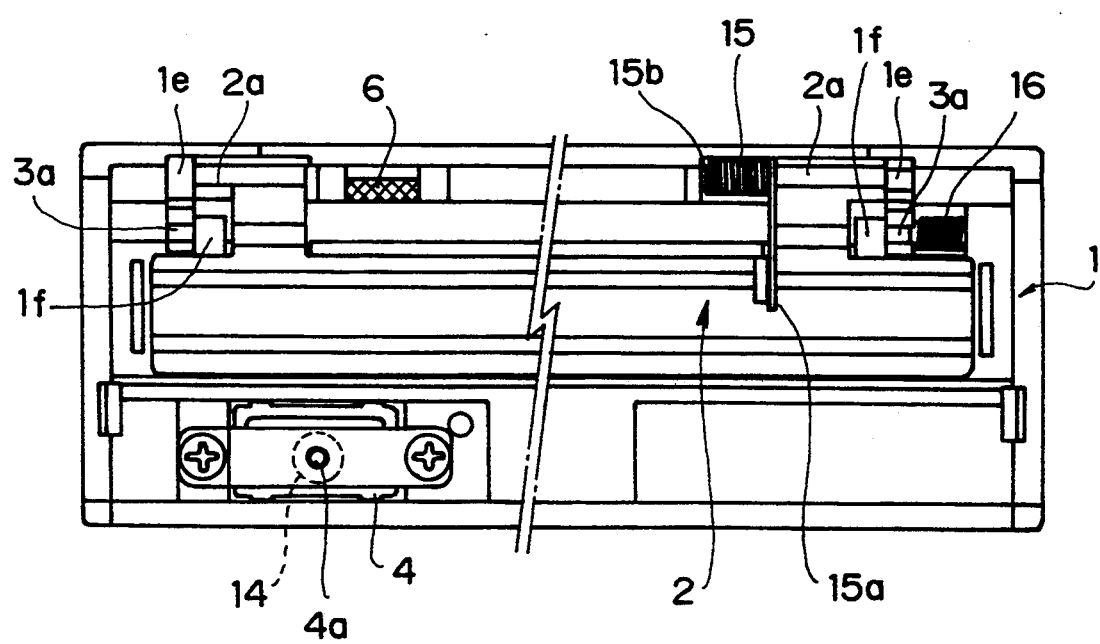
FIG. 2 is a rear view of the opening/closing door mechanism of the embodiment.

FIG. 2 is a rear view of the mechanism shown in FIG. 1. On the rear side of the panel main body 1, a pair of bearing portions 1e are formed near the upper edge portion of the panel main body 1, while a pair of bearing portions 1f are formed slightly below the bearing portions 1e. A pair of pivot shafts 2a are integrally formed on the first door 2. The pivot shafts 2a are pivotally supported by the bearing portions 1e. A first torsion spring 15 is wound around one of the pivot shafts 2a. A first torsion spring end 15b is fixed to the main body 1 side, and the other spring end 15a is brought into contact with a rear surface portion of the first door 2 to bias the door. With this structure, the first door 2 is biased in a direction to close the opening portion 1a, as shown in FIG. 2.

A pair of pivot shafts 3a are integrally formed on the second door 3 by, e.g., injection molding using a resin material. The pivot shafts 3a are pivotally supported by the bearing portions 1f. A second torsion spring 16 is wound around one of the pivot shafts 3a. One end of the torsion spring 16 is fixed to the main body 1 side, while the other end is brought into contact with a predetermined portion of the second door 3, to bias the door. With this structure, the second door 3 is biased to extend along the ceiling portion of the opening portion 1a. A projection 4a is integrally formed on the ejection button 4. The ejection button 4 is biased by a coil spring 14 (indicated by the broken line in FIG. 2) to always project to the front from the main body 1. When the ejection button 4 is depressed, an ejection function arranged in the disk mechanism works. Note that one torsion spring (coil spring) may be arranged to act on two arms in opposite directions so that the two arms are used to bias the first and second doors, respectively.

Figure 3:
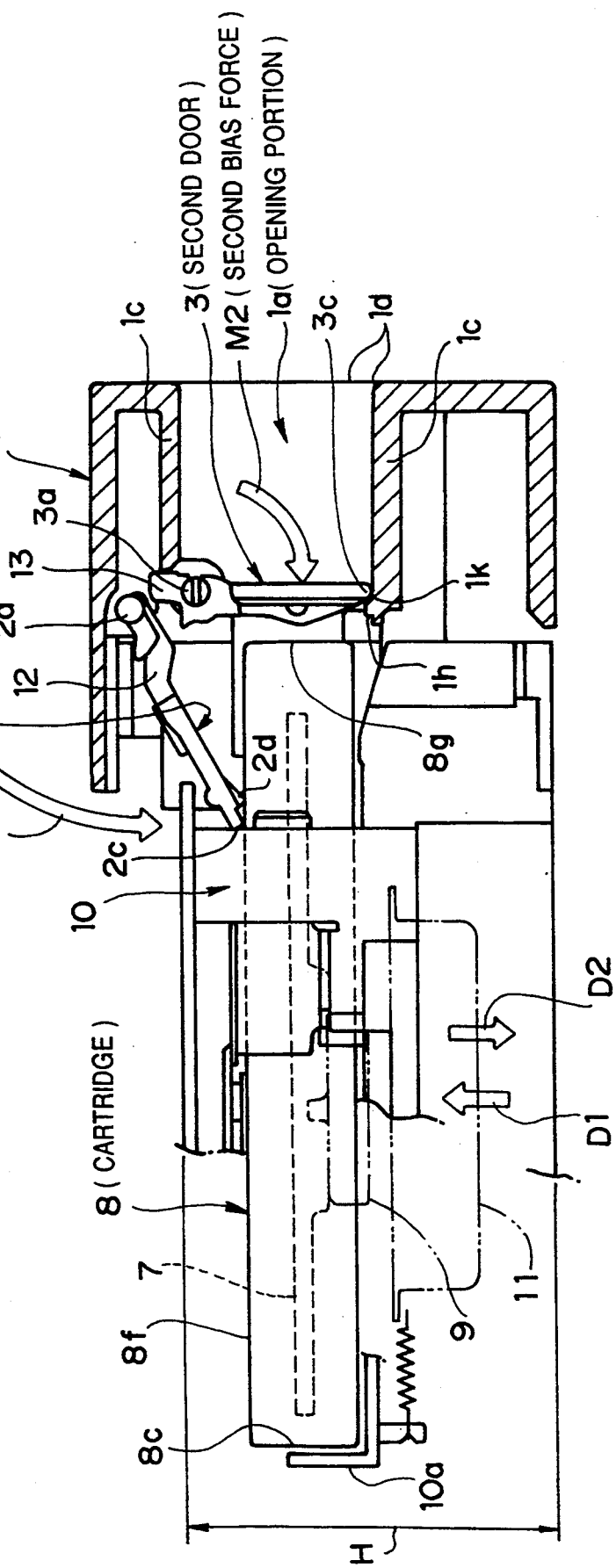
FIG. 3 is a sectional view showing the opening/closing door mechanism and taken along a line X—X in FIG. 1.

FIG. 3 is a view showing the opening/closing door mechanism together with part of the disk mechanism and taken along a line X—X in FIG. 1. Referring to FIG. 3, the panel main body 1 is fixed to the front surface of a disk mechanism 10. After a cartridge 8 is inserted, a member 10a constituting an ejection mechanism is in contact with an insertion end face 8c of the cartridge 8 in a biased state. In this state, the cartridge 8 is ejected through the opening portion 1a of the panel main body 1 upon an operation of the ejection button 4 described above.

An MO disk 7 (indicated by the broken line in FIG. 3) is pivotally housed in the cartridge 8. Upon insertion of the cartridge 8, a spindle motor 11 (indicated by the alternate long and two short dashed line in FIG. 3) is raised in the direction indicated by an arrow D1 in FIG. 3 so that a chucking portion 9 automatically chucks the cartridge 8. In contrast to this, upon the above-mentioned ejecting operation, the spindle motor 11 is lowered in the direction indicated by an arrow D2 so that the chucking portion 9 retreats from the cartridge 8.

That is, when the cartridge 8 is moved parallel to the disk mechanism 10, all the operations, i.e., inserting, recording/reproducing, and ejecting operations can be performed. A height H of the disk mechanism 10 is minimized, and a magneto-optical pickup mechanism, a tracking mechanism, and the like are designed to be housed within the predetermined height H.

The panel main body 1 indicated by the hatched cross-sections in FIG. 3 is fixed to the front surface portion of the disk mechanism 10 described above by click-fitting or the like in such a manner that the opening portion 1a of the panel main body 1 is located at a position where the cartridge 8 can be inserted/ejected.

As shown in FIG. 3, the opening portion 1a has a wall portion 1c extending from the front edge portion 1d to an opening innermost rear surface portion 1h. An edge portion 3c of the second door 3, which is axially supported by the pivot shafts 3a and biased in the direction indicated by an arrow M2 in FIG. 3 by the second torsion spring 16, as described above, is brought into contact with an inclined front surface portion 1k of the opening innermost portion 1h so as to restrict further pivotal movement of the second door 3. With this operation, the opening innermost portion 1h is covered with the second door 3. When the second door 3 is pivoted in a direction opposite to the direction indicated by the arrow M2, the second door 3 can be set to extend along the ceiling portion of the wall portion 1c (illustrated in FIG. 6). A lock projection 13 is integrally formed on the second door 3 on the opposite side of each pivot shaft 3a to the second door 3. The lock projection 13 is fitted and locked in a lock hole 12 formed in the first door 2. As will be described later, with this structure, when the second door 3 extends along the ceiling portion of the wall portion 1c, this open state can be held.

The first door 2 is biased in the direction indicated by an arrow M1 in FIG. 3 by the first torsion spring 15. When the cartridge 8 is inserted, the first door 2 is pivoted in a direction opposite to the direction indicated by the arrow M1, and the cartridge 8 is set in the mounted state shown in FIG. 3. In this case, a slidable contact portion 2d near an edge portion 2c of the first door 2 is brought into contact with an upper surface 8f of the cartridge 8 so that further pivotal movement of the first door 2 is restricted.

The lock hole 12 is integrally formed in the first door 2 on the pivotal side. The lock projection 13 formed on the second door 3 is fitted and locked in the lock hole 12. As described above, with this structure, when the second door 3 extends along the ceiling portion of the wall portion 1c, this open state of the second door 3 can be held while the first door 2 is set in a closed state.

Figure 4:
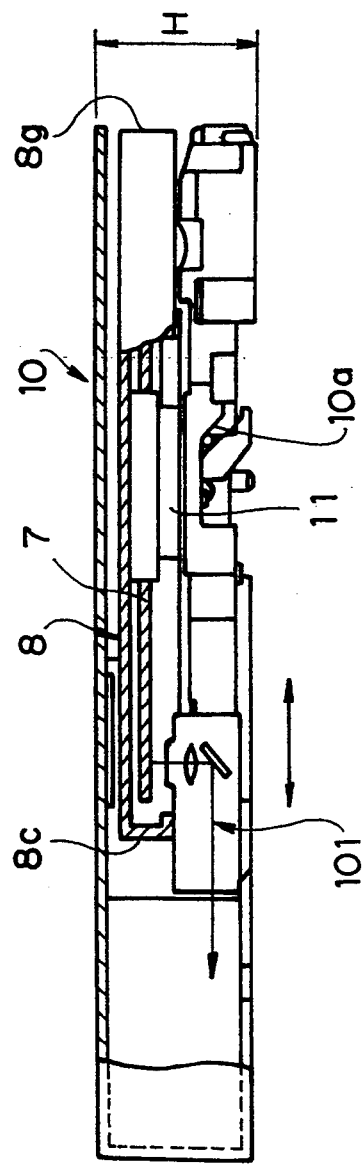
FIG. 4 is a partially cutaway right side view showing a main part of a disk mechanism 10.
Figure 5:
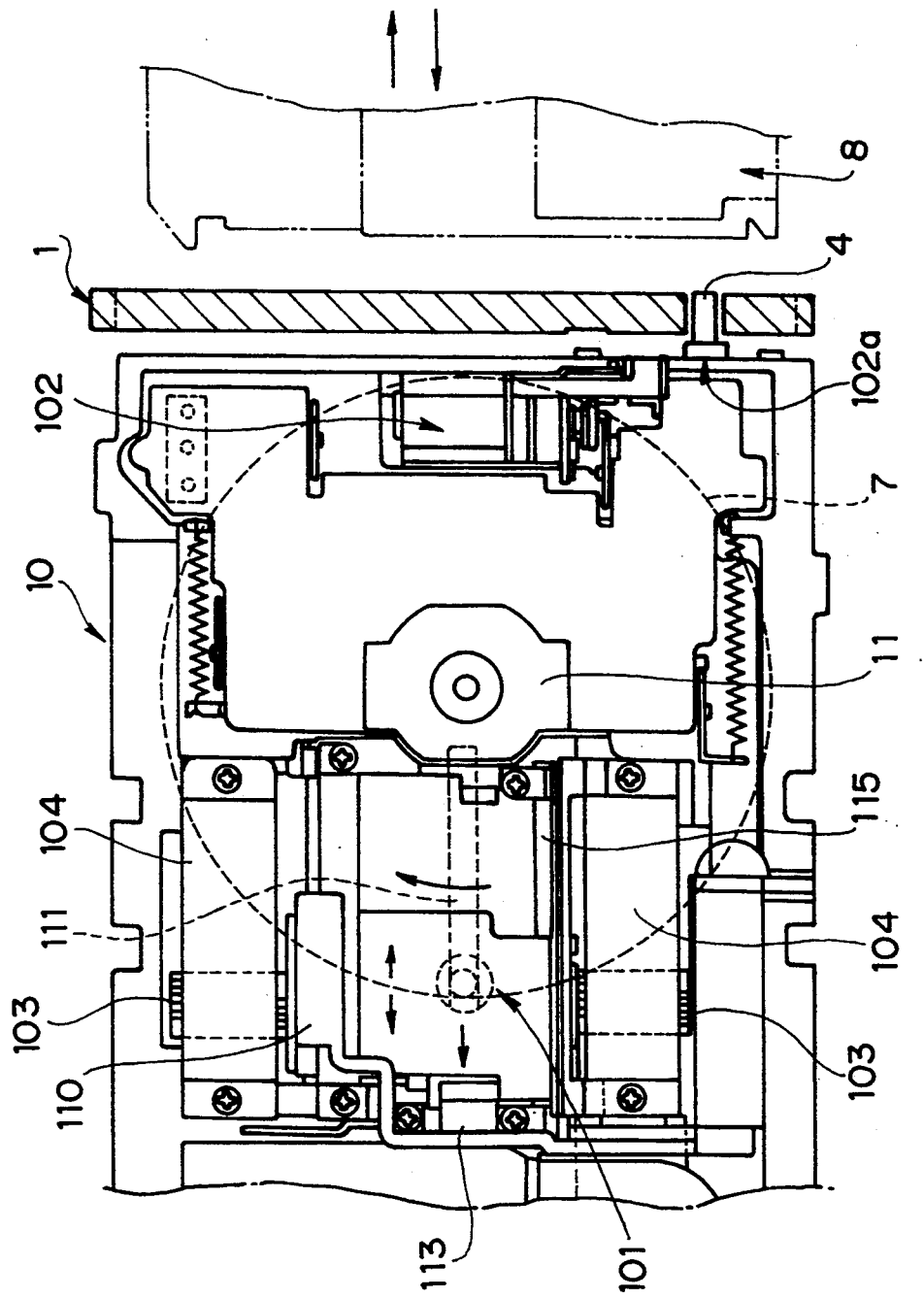
FIG. 5 is a partially cutaway plan view showing a main part of the disk mechanism 10.

FIG. 4 is a partially cutaway right side view of a main portion of the disk mechanism 10. FIG. 5 is a partially cutaway plan view of a main portion of the disk mechanism 10. Referring to FIG. 4, the cartridge 8 has already been mounted, and the MO disk 7 is chucked to the spindle motor 11. The spindle motor 11 is fixed to a vertically moving member (not shown) having pins on both side surfaces, which pins move along a main body inclined groove portion 10a of the disk mechanism 10. Upon vertical movement of the moving member, the spindle motor 11 is vertically moved.

A magneto-optical pickup 101 is driven by a linear actuator (to be described later) in the directions indicated by the arrows in FIG. 5 to record/reproduce data on/from a predetermined track on the MO disk 7.

Referring to FIG. 5, an ejection switch 102a is arranged on the panel main body 1 indicated by hatching such that the switch 102a can be depressed by the ejection button 4. When the ejection switch 102a is turned on, an ejection motor mechanism 102 is operated to automatically eject the cartridge 8.

The magneto-optical pickup 101 is translated by a linear actuator constituted by coils 103 which extend through a pair of magnetic field generating sections 104 and are guided therealong, and is fixed on a carriage 110 guided by a guide rod 115. With this structure, the magneto-optical pickup 101 performs a predetermined magneto-optical recording/reproducing operation through a lens 113 fixed to the disk mechanism 10 side.

Figure 6:
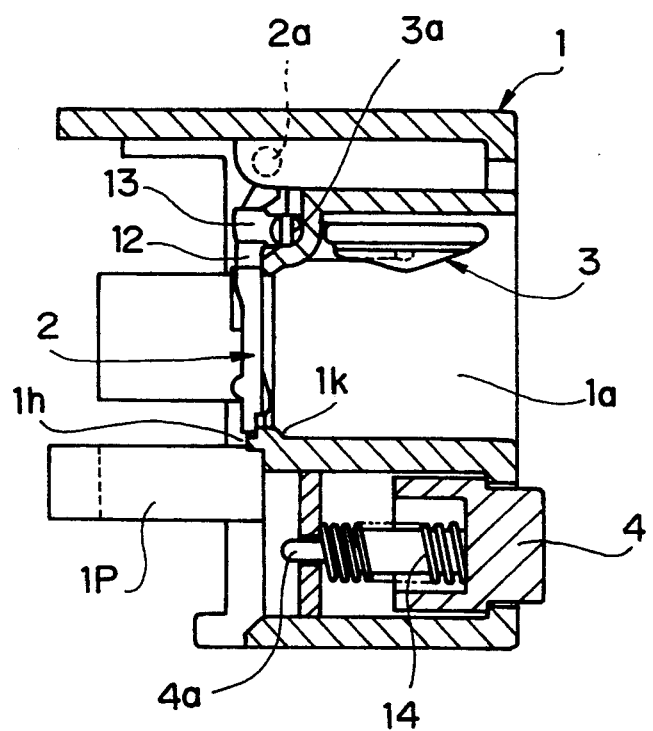
FIG. 6 is a sectional view showing the opening/closing mechanism and taken along a line Y—Y in FIG. 1.

FIG. 6 is a view of the opening/closing door mechanism, taken along a line Y—Y in FIG. 1. As shown in FIG. 6, while the opening portion 1a is closed by the first door 2, the lock projection 13 of the second door 3 is fitted and locked in the lock hole 12 of the first door 2. In this case, the panel main body 1 is completed in advance as a subassembly, considering the state shown in FIG. 6 as an assembly unit, and the panel main body 1 is then fixed to the disk mechanism 10 by using the elastic forces of click-fitting portions 1P respectively formed on right and left portions of the panel main body 1, thereby facilitating an assembly operation.

Figure 7:
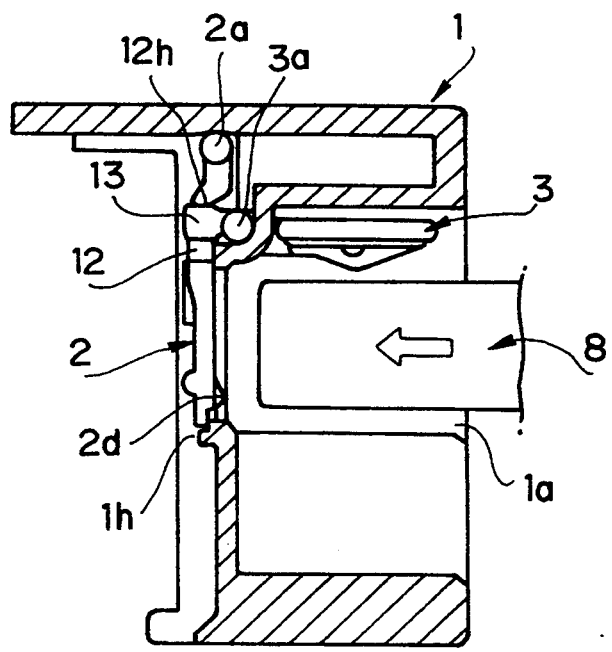
FIG. 7 is a sectional view showing a state immediately before insertion of a cartridge to explain an operation of the embodiment.

An operation of the opening/closing door mechanism having the above-described arrangement will be described in detail below with reference to FIGS. 6 to 12. FIG. 7 is a sectional view showing the opening/closing door mechanism while the magneto-optical disk apparatus is not used. This state is the same as that shown in FIG. 6. That is, the lock projection 13 of the second door 3 is fitted in the Lock hole 12 of the second door 3 to extend along the ceiling portion of the wall portion of the opening portion 1a. In this state, the cartridge 8 is inserted in the direction indicated by the hollow arrow in FIG. 7.

Figure 8:
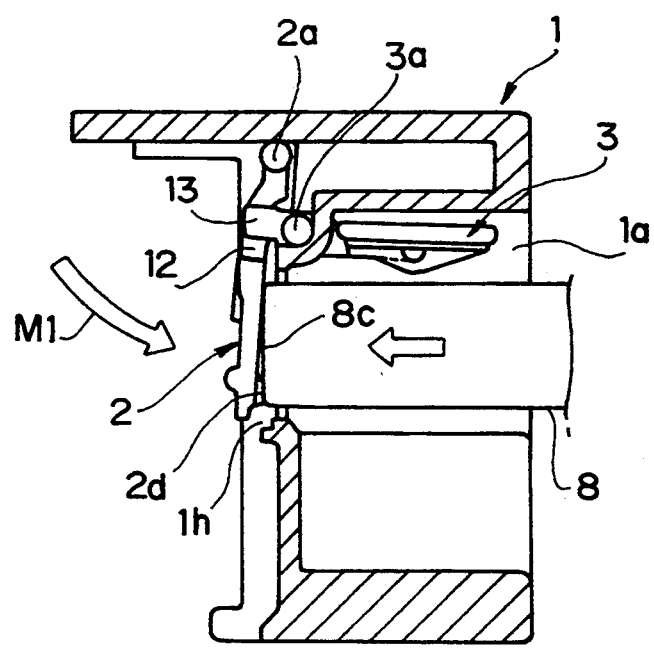
FIG. 8 is a sectional view for explaining an operation of the embodiment, showing a state wherein a first door 2 is opened when the cartridge is inserted.

When the cartridge 8 is inserted in the direction indicated by the hollow arrow, the insertion end face 8c of the cartridge 8 is brought into contact with the slidable contact portion 2d, as shown in FIG. 8. When the cartridge 8 is further inserted in this state, the first door 2 is pivoted against a first biasing force M1 while the door 2 is gradually released from the engaged state described above. When the first door 2 is completely released from the engaged state, the door is set in the state shown in FIG. 9.

Figure 9:
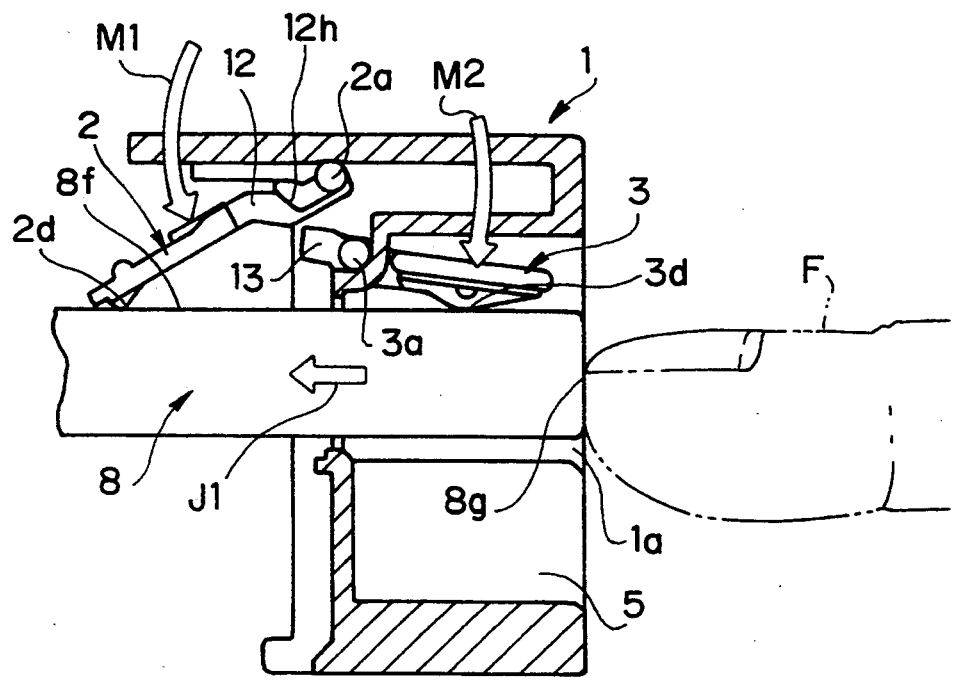
FIG. 9 is a sectional view for explaining an operation of the embodiment, showing a state wherein the first door 2 is fully opened upon insertion of the cartridge, and the locked state with respect to a second door 3 is released.

In the state shown in FIG. 9, since the slidable contact portions 2d and 3d of the first and second doors 2 and 3 are urged against the upper surface 8f of the cartridge 8 with the biasing forces M1 and M2, the pivotal movement of each door, which is released from the engaged state, is restricted. When an ejection end portion 8g of the cartridge 8 is further inserted in the direction indicated by an arrow J1 with a finger tip F or the like, the urged state of the second door 3 with respect to the upper surface 8f of the cartridge 8 is released, and the state shown in FIG. 10 is set.

Figure 10:
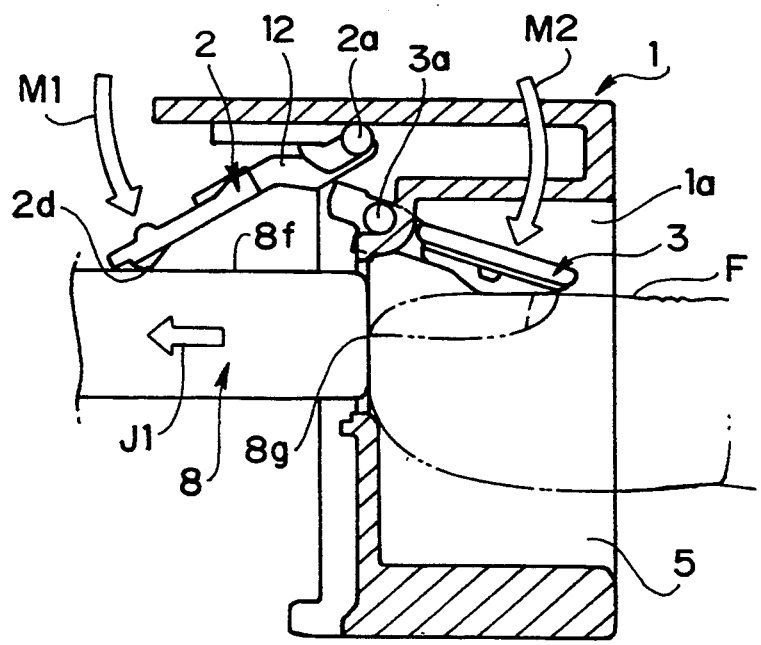
FIG. 10 is a sectional view for explaining an operation of the embodiment, showing a state immediately before a cartridge 8 is inserted to the end.

In the state shown in FIG. 10, when the ejection end portion 8g of the cartridge 8 is further pushed with the finger tip F or the like, the second door 3 is brought into direct contact with the finger tip F, and the pivotal movement of the second door 3 is restricted. On the other hand, when the ejection end portion 8g of the cartridge 8 is inserted to this position, the chucking function of the disk mechanism works to automatically chuck the cartridge 8 deeper into the disk mechanism.

Figure 11:
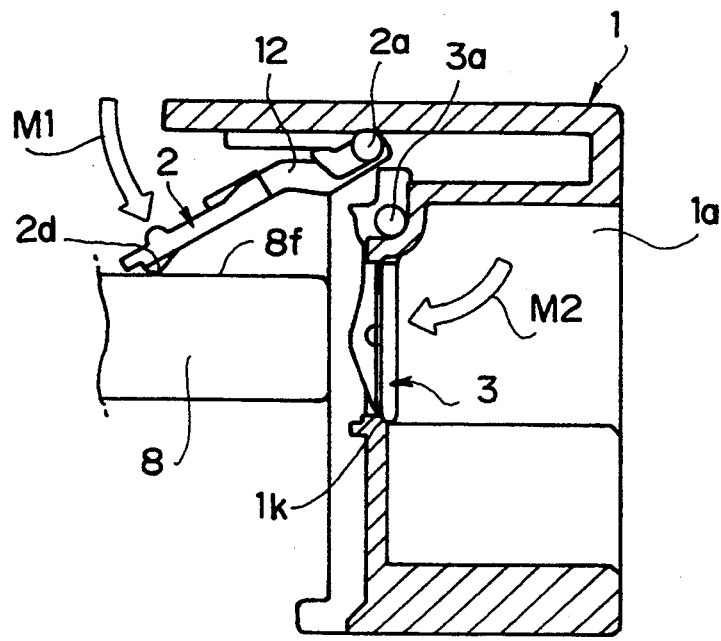
FIG. 11 is a sectional view for explaining an operation of the embodiment, showing a state wherein the cartridge 8 is completely inserted.

At this time, the finger tip F is released from the cartridge 8 to set the second door 3 in contact with the inclined surface portion 1k, as shown in FIG. 11. That is, the state shown in FIG. 3 is set.

Figure 12:
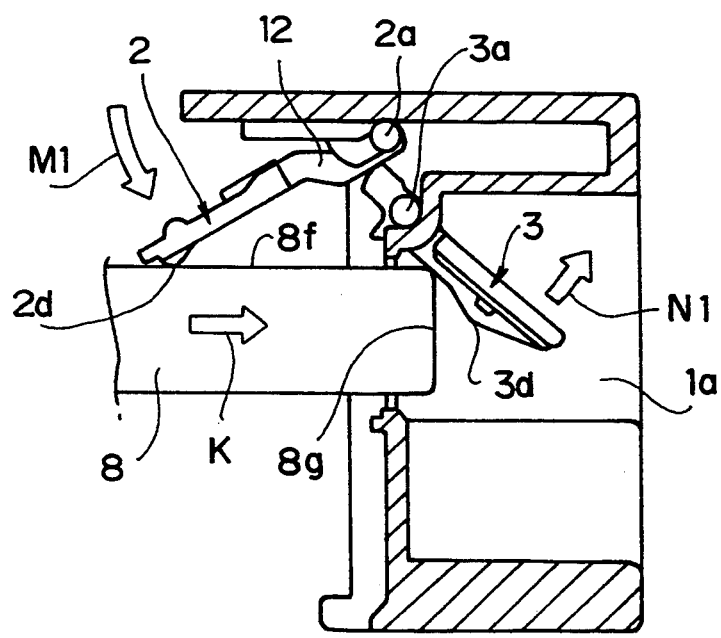
FIG. 12 is a sectional view for explaining an operation of the embodiment, showing a state wherein the cartridge 8 is ejected.

In an ejecting operation, when the cartridge 8 is ejected by the ejection function in the direction indicated by an arrow K in FIG. 12 in the state shown in FIG. 11, the ejection end portion 8g is brought into contact with the slidable contact portion 3d of the second door 3, and the second door 3 is pivoted in the direction indicated by an arrow N1, thus pushing and opening the opening portion 1a, as shown in FIG. 12. Meanwhile, the first door 2 is kept in contact with the upper surface 8f of the cartridge 8, while a biasing force keeps acting on the first door 2 to pivot the door in the direction indicated by an arrow M1. As a result, the cartridge 8 is ejected in the direction indicated by an arrow K to be ejected from the opening portion 1a. Thereafter, the state shown in FIG. 7 is restored.

Figure 13:
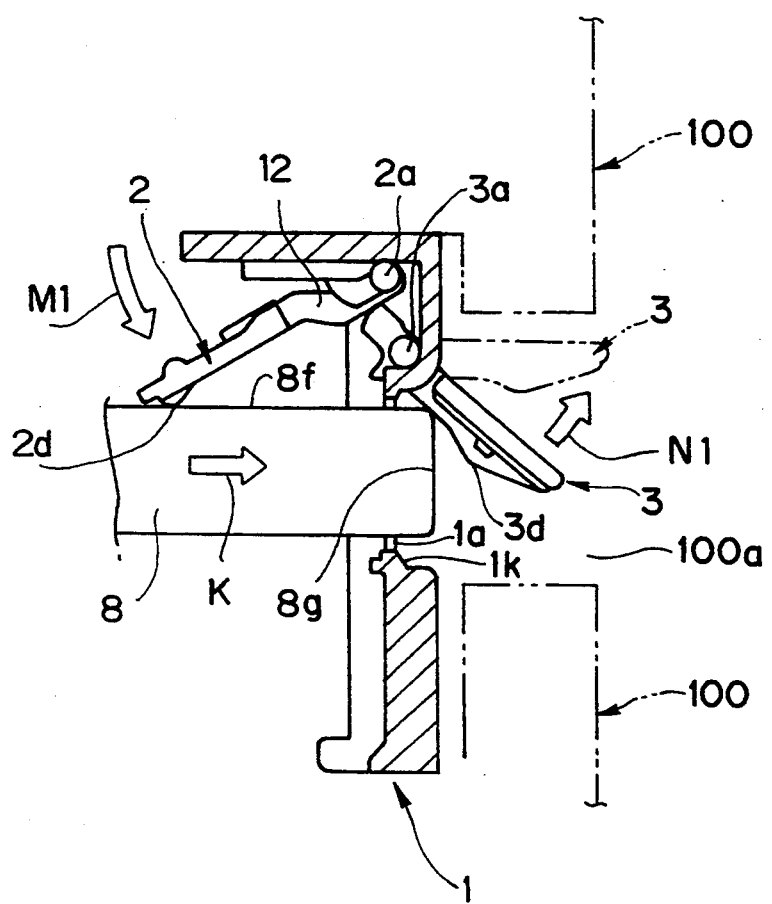
FIG. 13 is a sectional view showing a main part of a modification of the embodiment.

FIG. 13 is a sectional view showing a main part of a modification of the embodiment described above. As shown in FIG. 13, an opening portion 1a is formed on substantially the same plane as that of a panel 1, and the above-described second door 3 is designed to be pivoted/moved, as indicated by the solid and broken lines. In this arrangement, the second door 3 protrudes outside the panel 1 and hence may be broken accidentally. Therefore, the second door 3 may be arranged inside an opening portion 100a of a panel 100 on the apparatus main body side, as indicated by the alternate long and two short dashed line.

As described above, since the cartridge 8 is inserted parallel to the opening portion 1a, and is ejected after a recording/reproducing is performed with respect to the cartridge 8 in the disk apparatus, the profile of such an apparatus can be reduced. In addition, the opening portion is always sealed completely with either the first door or the second door regardless of whether a cartridge is mounted or not, thereby providing an opening/closing door mechanism having excellent dust- and sound-proof functions. When the ejection end portion 8g of the cartridge 8 is used as a display portion, there is no possibility that the contents of the cartridge 8 are recognized by a third person.

In the above-described embodiment, the present invention is applied to only an apparatus using an MO disk as a medium. It is, however, apparent that the present invention can be properly applied to apparatuses using various types of conventional media, such as an FD cartridge, an optical disk containing a read-only cartridge, a CD, a CD-ROM, and a magnetic tape cassette.

As has been described above, there is provided an opening/closing door mechanism which can reduce the profile of an apparatus by allowing a medium to be inserted parallel to an opening portion and to be ejected upon a recording/reproducing operation, can obtain an excellent dust-proof function, and prevents a third person from knowing the contents of the medium in use when the rear end portion of the cartridge as the medium is used as a display portion.

The torsion spring 15, 16 described above can be arranged as one part by incorporating torsion spring end 15b, 16b each of which generates different direction force.

The present invention is not limited to the above embodiments and various changes and modifications can be made within the spirit and scope of the present invention. Therefore, to apprise the public of the scope of the present invention the following claims are made.

What is claimed is:

1. An opening/closing door mechanism for an apparatus having recording and/or reproducing means including means for moving a cartridge in a substantially linear path during insertion and ejection of said cartridge through an insertion/ejection opening to perform a recording and/or reproducing operation with a medium incorporated in said cartridge, the opening/closing door mechanism comprising:

a panel main body having an opening portion to be located near the insertion/ejection opening to guide said cartridge for movement in the linear path, the opening having spaced elongated parallel edge portions normal to the linear path, said elongated side edge portions having front and rear surfaces;

a first door having one end pivotally supported on a first pivot axis proximate to and parallel with one elongated edge portion of said opening portion, and having further a first lock portion near said first pivot axis, said first door being biased toward the rear surface of said elongated parallel edge portions to cover said opening portion;

a second door having one end pivotally supported on a second pivot axis near the one elongated edge portion and parallel to the first pivot axis, the second door including a second lock portion located near said second pivot axis to engage with said first lock portion, said second door being biased toward the front surface of said elongated parallel edge portions to cover said opening portion but retained in an open position by engagement of the first and second lock portions;

whereby the second door is positioned in said open position before insertion of the cartridge, the first door is rotated upon insertion of the cartridge to release engagement of the first and second lock portions, and the second door is rotated to cover the opening portion after insertion of the cartridge.

2. A mechanism according to claim 1, wherein said panel main body is detachably fixed to the apparatus.

3. A mechanism according to claim 1, wherein said panel main body and/or said first and second doors are formed by injection molding using a resin material.

4. A mechanism according to claim 1, wherein said apparatus is a recording/reproducing apparatus using one of a magnetic disk medium, a magneto-optical disk medium, and an optical disk medium rotatably incorporated in said cartridge.

5. An opening/closing door mechanism for an apparatus having recording and/or reproducing means including means for moving a cartridge in a substantially linear path during insertion and ejection of said cartridge through an insertion/ejection opening to perform a recording and/or reproducing operation with a medium incorporated in said cartridge, the door mechanism comprising:

a panel main body having an opening portion to guide said cartridge for movement in the linear path, said opening portion having spaced elongated parallel side edge portions normal to the linear path and having front and rear surfaces, the opening portion also having a wall portion extending forwardly, parallel to the linear path, from the elongated parallel side edge portions to a front end, said opening portion having a first support portion for pivotally supporting a first door on a first pivot axis near one of the elongated side edge portions and including first biasing means biasing said first door toward the rear surface of said elongated side edge portions to cover said opening portion;

said opening portion having a second support portion for pivotally supporting a second door on a second pivot axis near the one elongated side edge portion and further including second biasing means biasing said second door toward the front surface of said elongated side edge portions to cover said opening portion;

said first door including a first pivot portion and a first lock portion located near said first pivot portion;

said second door including a second pivot portion and a second lock portion arranged near said second pivot portion to lock with said first lock portion;

whereby the second door is positioned in said open position before insertion of the cartridge, the first door is rotated upon insertion of the cartridge to release engagement of the first and second lock portions, after the second door is rotated to cover the opening portion after insertion of the cartridge.

6. A mechanism according to claim 5, wherein said opening portion of said panel main body has an opening area equal to the sum of a cross-sectional area of said cartridge in a direction perpendicular to the linear path and a clearance area, and a recess portion extending from the front end of the wall portion to the elongated parallel side edge portions.

7. A mechanism according to claim 5, wherein said first biasing means and/or said second biasing means is a torsion spring placed around said first and second pivot axes, said torsion spring being placed around at least one of said first and second pivot portions.

8. A mechanism according to claim 5, wherein said first and second biasing means are torsion springs placed around one of said first and second pivot portions and located near said first and second lock portions of said first and second doors.

9. An apparatus having recording/reproducing means including means for moving a cartridge of a predetermined shape in a substantially linear path for insertion and ejection of said cartridge through an insertion/ejection opening to perform a recording/reproducing operation with a medium incorporated in said cartridge, the apparatus also having an opening/closing door mechanism comprising:

a panel main body having an opening portion to guide said cartridge for movement in said linear path, said opening portion having spaced elongated parallel side edges normal to the linear path and having front and rear surfaces, the opening portion also having a wall portion extending forwardly, parallel to the linear path, from the elongated parallel side edges of said opening portion to a front end, said opening portion having a first support portion for pivotally supporting a first door on a first pivot axis near one of the elongated parallel edge portions and including first biasing means biasing said first door toward the rear surface of said parallel side edge portions to cover said opening portion;

said opening portion having a second support portion for pivotally supporting a second door on a second pivot axis near the one edge portion and further including second biasing means biasing said second door toward the front surface of said parallel side edge portions to cover said opening portion;

said first door including a first pivot portion and a first lock portion located near said first pivot portion;

said second door including a second pivot portion and a second lock portion located near said second pivot portion to lock with said first lock portion;

whereby the second door is positioned in said open position before insertion of the cartridge, the first door is rotated upon insertion of the cartridge to release engagement of the first and second lock portions, and the second door is rotated to cover the opening portion after insertion of the cartridge.

10. An apparatus according to claim 9, wherein said medium incorporated in said cartridge is a magneto-optical disk, said opening portion of said panel main body has an opening area equal to the sum of a cross-sectional area of said cartridge in a direction perpendicular to said linear path and a clearance area, and wherein said opening portion further includes a recess portion extending from the front end of said wall portion to the elongated parallel side edge portions, said recess portion being located substantially at a middle portion of said opening portion.

11. An opening/closing door mechanism for an apparatus having recording and/or reproducing means including means for moving a cartridge in a substantially linear path during insertion and ejection of said cartridge through an insertion/ejection opening to perform a recording and/or reproducing operation with a medium incorporated in said cartridge, the door mechanism comprising:

a panel main body having an opening portion to be located near the insertion/ejection opening to guide said cartridge for movement in the linear path, the opening portion having spaced elongated parallel edge portions normal to the linear path;

a pair of first supporting portions located near one of the elongated edge portions;

a pair of second supporting portions located near the first supporting portions and the same one of the elongated edge portions;

a backside stopper portion provided at the other elongated edge portion of the opening portion;

a frontside stopper portion provided at the other elongated edge portion of the opening portion;

a first door at the opening portion and having a pair of first supported portions pivotally supported by the first supporting portions, a locking portion, and first biasing means for biasing the first door to rotate toward the backside stopper portion;

whereby the first door closes the opening portion against the backside stopper portion under bias by the first biasing means before the cartridge is inserted and is rotated against the bias by the first biasing means when the cartridge is inserted;

a second door located at the opening portion, forward of the first door, and having a pair of second supported portions pivotally supported by the second supporting portions, a locked portion to be locked by the locking portion, and second biasing means for biasing the second door to rotate toward the frontside stopper;

whereby, before the cartridge is inserted, the second door is positioned to open the opening portion, and when the cartridge is inserted, rotation of the first door unlocks the locked portion from the locking portion, and after the cartridge is inserted into an operating position, the second door is rotated by the second biasing means against the frontside stopper portion to cover the opening portion.

12. An opening/closing door mechanism according to claim 11, wherein the locking portion of the first door is formed near one of the first supported portions, and the locked portion of the second door is formed near one of the second supported portions.

* * * * *